United States Patent
Chong et al.

(10) Patent No.: US 7,985,338 B1
(45) Date of Patent: Jul. 26, 2011

(54) ALGAL PURIFICATION SYSTEM WITH EFFICIENT SOLAR LIGHT UTILIZATION

(76) Inventors: Ning Chong, Hong Kong (HK); Lan Wong, Hong Kong (HK)

( * ) Notice: Subject to any disclaimer, the term of this patent is extended or adjusted under 35 U.S.C. 154(b) by 0 days.

(21) Appl. No.: 12/978,430

(22) Filed: Dec. 24, 2010

(51) Int. Cl.
*C02F 3/32* (2006.01)
(52) U.S. Cl. ............... 210/602; 210/603; 210/170.01
(58) Field of Classification Search ............ 210/602, 210/603, 170.01
See application file for complete search history.

(56) References Cited

U.S. PATENT DOCUMENTS

| | | | |
|---|---|---|---|
| 3,565,797 A * | 2/1971 | Gresham | 210/602 |
| 4,333,263 A | 6/1982 | Adey | |
| 5,097,795 A | 3/1992 | Adey | |
| 5,573,669 A | 11/1996 | Jensen | |
| 6,355,172 B1 | 3/2002 | Diels et al. | |
| 6,635,177 B2 * | 10/2003 | Oswald et al. | 210/602 |
| 6,883,271 B2 | 4/2005 | Goldburt | |
| 7,682,503 B1 | 3/2010 | Norris | |
| 7,736,508 B2 * | 6/2010 | Limcaco | 210/602 |
| 7,776,211 B2 * | 8/2010 | Limcaco | 210/150 |
| 7,850,848 B2 * | 12/2010 | Limcaco | 210/602 |

OTHER PUBLICATIONS

Durrett et al., "Plant triacyglycerols as feedstocks for the production of biofuels", The Plant Journal 54(4), 593-607 (2008).
Hu et al., "Microalgal triacylglycerols as feedstocks for biofuel production: perspectives and advances", The Plant Journal 54 (4), 621-639 (2008).
Johnson et al., "Development of an attached microalgal growth system for biofuel production ", Applied Microbiology And Biotechnology 85(3), 525-534 (2010).
Robert F. Service, "ExxonMobil Fuels Venter's Efforts To Run Vehicles on Algae-Based Oil " Science 325 (5939), 379 (2009).
Zümriye Aksu, "Biosorption of Heavy Metals by Microalgae in Batch and Continuous Systems", Wastewater Treatment with Algae, 37-53 (1998).
Brouers et al., "immobilized cells: An appraisal of the methods and applications of cell immobilization techniques", Algal and cyanobacterial biotechnology, p. 272-293 (1989).
Darnall et al., "Selective recovery of gold and other metal ions from an algal biomass", Environ. Sci. Technol. 20(2), 206-208 (1986).
Darnall et al., "Recovery of Heavy Metals by Immobilized Algae", Trace Metal Removal from Aqueous Solution, p. 1-24 (1986).
Khummongkol et al., "Accumulation of heavy metals in unicellular algae", Biotechnology and Bioengineering 24(12), 2643-2660 (1982).
Hameed et al., "Biotechnological Potential Uses of Immobilized Algae", International Journal of Agriculture & Biology 9(1), 183-192 (2007).
Chevalier et al., "Wastewater nutrient removal with microalgae immobilized in carrageenan", Enzyme Microb. Technol. vol. 7, p. 621-624 (1985).

* cited by examiner

*Primary Examiner* — Fred Prince
(74) *Attorney, Agent, or Firm* — Ella Cheong Hong Kong; Margaret A. Burke; Sam T. Yip (57) ABSTRACT

The present invention relates to an algal purification system. In particular, the present invention relates to a biological purification system incorporating light-converting materials and sun trackers to enhance photosynthesis of algae therein in order to treat wastewater from municipal, agricultural and industrial sources.

20 Claims, 8 Drawing Sheets

ALGAL PURIFICATION SYSTEM WITH EFFICIENT SOLAR LIGHT UTILIZATION

TECHNICAL FIELD

The present invention relates to an algal purification system with efficient solar light utilization for treating wastewater. In particular, the present invention relates to a biological purification system incorporating light-converting materials and utilizing solar trackers to enhance photosynthesis of algae therein.

BACKGROUND OF THE INVENTION

Water pollution is mainly caused by human activities such as agriculture, fish rearing and industrial production. Biological decomposition by using aerobic or anaerobic organisms is claimed to be one of the most 'green' methods to treat wastewater. However, inorganic compounds such as nitrates and phosphate ions still remain in the treated water after these conventional methods, which will cause environmental problems such as eutrophication or ground water contamination. U.S. Pat. Nos. 4,333,263 and 5,097,795, disclose an algal turf scrubber using macroalgae for removing the excessive nutrients from waste water. These prior arts relate to immobilized systems which have been shown to accumulate more heavy metals than a free cell system (Brouers et al., 1989; Darnall et al., 1986; Khummongkol et al., 1982; Aksu, 1998). Chevalier (1985) has shown that the uptake of nitrogen and phosphorus by immobilized *Scenedesmus* sp. is greater than uptake by the free cells of the same organism. In a comparison among different strains of algae, a recent study by Johnson et al. (2010) showed that microalgae in general are more effective than macroalgae in removing the inorganic compounds from wastewater.

Another limitation for algae wastewater purification is light intensity. For example, U.S. Pat. Nos. 6,355,172 and 7,682,503 disclose the use of algae to remove metals from sewage; however both inventions are required to be immersed in water. The high turbidity in the fluid phase is the determining factor of blocking the penetration of natural light into sewage such that the fluid at the middle or bottom level may not have sufficient light intensity for algae to carry out photosynthesis, even though the fluid phase is separated from the solid phase and the sludge in a pre-settling process.

Converting unsuitable wavelengths into suitable wavelengths for photosynthesis is one way to enhance the light intensity by using luminescent materials. In U.S. Pat. No. 6,883,271, a device that converts UV light into growth-enhancing light for growth of plants or vegetables is disclosed. However, such a device is limited to the conversion of UV light and is unable to convert a wide range of non-visible light into a specific wavelength of visible light for specific photosynthetic organisms. A more flexible and compatible light-converting device is required.

In addition to wastewater treatment, algae are also good candidates for alternative energy because their by-product and/or biomass can be converted into biofuel. For example, oils derived from triacylglycerols in oil seed plants (e.g. soybean, sunflower and oil palm etc.) (Durrett et al., 2008) or microalgae (Hu et al., 2008) can be made into biodiesel. Algae is more preferable as a source of biofuel since a recent study reveals that algae have inherent advantages over other sources of biofuel such as higher yield, more rapid cell division and better quality (Robert, 2009).

Therefore, there is a need in the art for an improved biological purification system to remove unwanted inorganic compounds from wastewater by effectively using natural light.

SUMMARY OF THE INVENTION

The present invention relates to a wastewater algal purification system. In particular, it relates to a biological purification system using algae as a biological purification agent. In an exemplary embodiment, the wastewater algal purification system comprises a light-converting device, one or more active or passive sun trackers incorporating a plurality of rotatable and/or tilting screens as algae-holding substrates with a rolling axis, a wastewater inlet and outlet, and a gas inlet. In one embodiment, the sun tracker of the present invention further comprises a solar position sensor positioned outside the system to sense the position of the sun during daytime and is also capable of nocturnal repositioning by a controller according to the sunset position of the preceding day. The degree and angle of rotation and/or tilting of the screens can be actively controlled either by electronic means such as an open loop tracking strategy (mathematical prediction of sun position based on past data or schedule without sensing the instant position of the sun) or by closed loop tracking strategy (determination of the instant sun position by the maximum light intensity of the day). In another embodiment, the screens can be passively controlled by non-electronic means using solar energy in the absence of the solar position sensor to rotate and/or tilt the screen. The movement of the sun tracker of the present invention can also be controlled by a combination of both active and passive mechanisms.

In another embodiment, a reflecting material is applied to the bottom of the system to ensure full utilization of the received light. In other embodiments, artificial lighting is incorporated into the system of the present invention to supplement or replace natural light for maintaining or enhancing photosynthesis of algae in the system. The shape, size and design of the sun tracker in the system including the screen, the rolling axis and the connective parts can vary subject to the needs of the wastewater treatment and other factors.

The light-converting portion of the present invention may include one or more layers of downconverting and/or upconverting luminescent materials. In one embodiment, the downconverting luminescent materials used in the present invention are quantum dots which are nanoparticles selected from semiconductor, inorganic or metallic materials. Each downconverting luminescent layer may include one or more types of quantum dots. In general, quantum dots are used to absorb high-energy light, including ultra-violet light, and emit a narrower wavelength of lower-energy light in a range of about 300 nm to 2,000 nm. A specific wavelength of light can be selected by using different combinations of quantum dots according to the absorption spectrum of the photosynthetic pigment in a specific selected organism.

The upconverting luminescent materials in the present invention can be nanoparticles or in a bulk form and are selected from metal oxides doped with ions of lanthanides or transition metal compounds. Upconverting luminescent materials in nanoparticles form are more preferable in the present invention because they are lower in light scattering and higher in luminescent efficiency than the same materials in bulk form. In general, upconverting luminescent materials are used to absorb infra-red light or near infra-red light and emit a shorter wavelength of higher-energy visible light in a range of about 400 nm to 800 nm. In combination with the quantum dot layer(s) of the present invention, the upconverted emission from the upconverting luminescent layer of the present invention may be partly or wholly absorbed by the quantum dot layer(s) and a desirable wavelength of light re-emitted. The layers of upconverting and downconverting luminescent materials may also be covered by one or more transparent layer(s). At least one surface of the wastewater algal purification system of the present invention is coated with one or more layers of the upconverting and downconverting luminescent materials.

The screens of the present invention are substrates for the ingrowth of the algal layer(s). Algae are selected from microalgae or a mixture of microalgae and macroalgae. Preferably, microalgae are grown on the screens of the present invention. The algae of the present invention can be naturally-occurring or genetically-modified organisms which are capable of carrying out photosynthesis. The algae can be co-cultured with symbiotic microorganisms in an exemplary embodiment of the present invention. The algae of the present invention may be used in the production of biofuel and other by-products.

Another aspect of the present invention is to provide methods of treating wastewater such as sewage. The method of treating sewage of the present invention includes the following steps: receiving sewage from a source into a settling pond; separating substantially large solid debris and sludge from the fluid phase of the sewage in the settling pond; transporting the fluid phase of the sewage from the settling pond to at least one wastewater algal purification system having plural screens with at least one layer of algae thereon; directing sunlight or artificial light to the screens through one or more layers of upconverting luminescent materials and/or one or more layers of downconverting luminescent materials coated on said wastewater algal purification system; supplying $CO_2$ from the atmosphere or an external source to the wastewater algal purification system; and collecting and processing the layers of algae from the screens regularly for production of biogas, biofuel or other by-products through methods including, but not limited to scraping, vacuum suction, vibration, centrifugation, flocculation, filtration or ultrasound wave.

The present invention is applicable to sewage treatment plants or industrial, agricultural or fishery facilities to treat wastewater. Furthermore, the use of the photosynthetic organisms produced in the present invention may optionally be used for the production of biofuel.

BRIEF DESCRIPTION OF THE DRAWINGS

These and other objects, aspects and embodiments of this claimed invention will be described hereinafter in more details with reference to the following drawings, in which:

DETAILED DESCRIPTION

Figure 1:
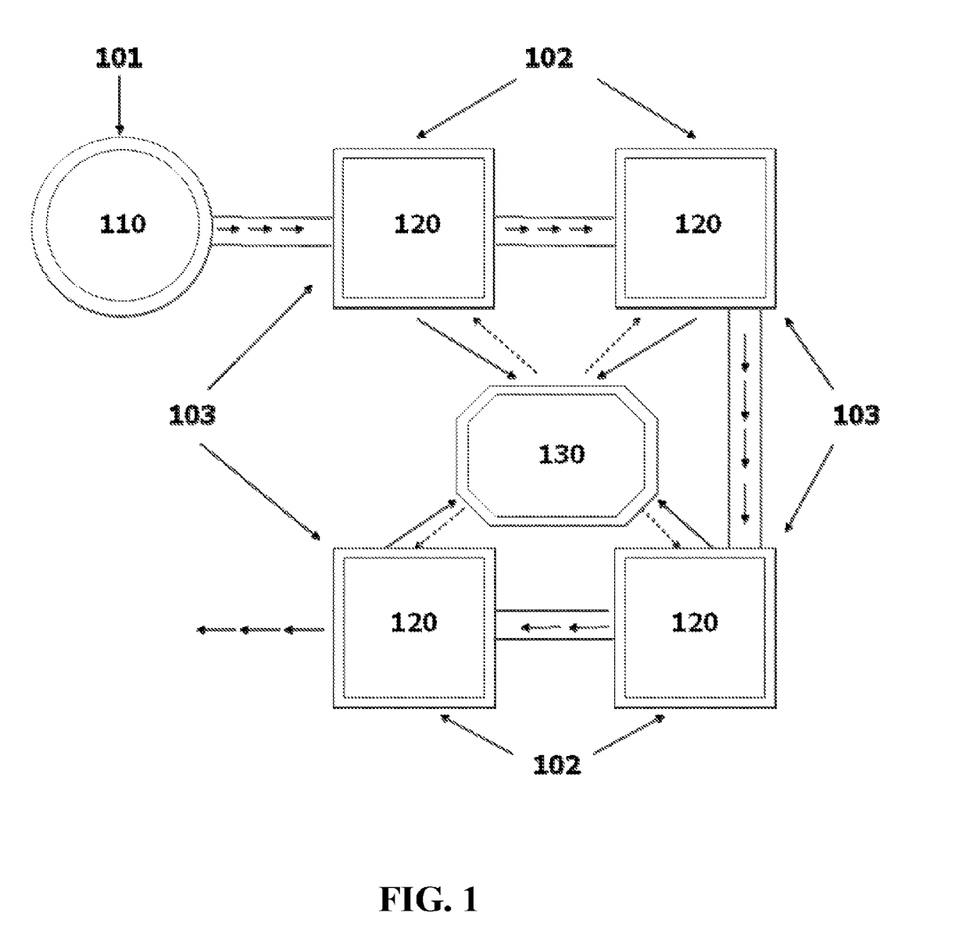
FIG. 1 is a flow chart depicting an exemplary embodiment of the wastewater algal purification system of the present invention.

FIG. 1 illustrates a combination of wastewater algal purification systems 120 connected to different parts of a wastewater treatment facility. A wastewater source 101 supplies untreated wastewater from municipal, industrial, agricultural or fishery facilities to the wastewater algal purification system 120. The wastewater may include sewage. Before the wastewater reaches the wastewater algal purification system 120, a settling pond 110 is usually installed as a first filtration mechanism to separate a fluid phase from a solid phase and sludge in the untreated wastewater by sedimentation. The settling pond 110 is connected to the wastewater source 101 and one or more wastewater algal purification systems 120 through one or more conduits. The conduits are incorporated with valve mechanisms (not shown in the figure) to control the flow of wastewater between the wastewater source 101 and the settling pond 110 or between the settling pond 110 and the wastewater algal purification system 120. The design of the settling pond 110 can be inversely conical, cylindrical or any 3-dimensional shape to facilitate the sedimentation of solids and sludge in the untreated wastewater. The settling pond 110 may additionally include one or more filters for finer filtration, as well as one or more openings (not shown in the figure) at the bottom or sidewall of the pond from which the sediments and sludge are removed. Carbon dioxide is supplied to one or more wastewater algal purification systems 120 from a carbon dioxide emission source 103 such as a power plant or an incineration plant. Each algal purification system 120 can be movable/mobile or can be fixed at a particular location. In some embodiments, the settling pond 110 itself contains the wastewater algal purification system, as discussed below.

Sunlight 102 is directed to one or more wastewater algal purification systems 120 by an active or passive sun tracking mechanism (not shown in the figure). Optionally, artificial light may be used as a substitute or supplement to the natural light to cope with the demand on the light intensity, e.g. cloudy weather, increase in algal density, increase in inorganic contents, etc.

The wastewater algae purification system 120 can be translucent or transparent which is coated with the light-converting device of the present invention. Optionally, the conduits connecting the settling pond 110 to each wastewater algal purification system 120 or those connecting among wastewater algal purification systems 120 or those connecting the wastewater algal purification 120 to an algal processor 130 are coated with the light-converting device of the present invention. The algal processor 130 is incorporated to collect the algal layers grown on the screens from the wastewater algal purification system 120. After collecting algal layers in the algal processor 130, the algal colonies remain on the surface of the screens will be saved for the next round of purification. Algae suspension will be harvested or can return to the wastewater algal purification system 120 for continuous growth if needed.

The light-converting device of the present invention is a series of luminescent materials which can either up-convert the lower-energy light or down-convert the higher-energy light into a spectrum of wavelengths or a specific wavelength of light absorbable by the pigment of the photosynthetic organisms for photosynthesis. In order to achieve light converting, different types of upconverting and downconverting luminescent materials are used. The light-converting device of the present invention can be multi-layers of upconverting and/or downconverting luminescent materials, or a single layer of upconverting and/or downconverting luminescent material, depending on the needs of the specific wavelength of light.

Figure 2A:
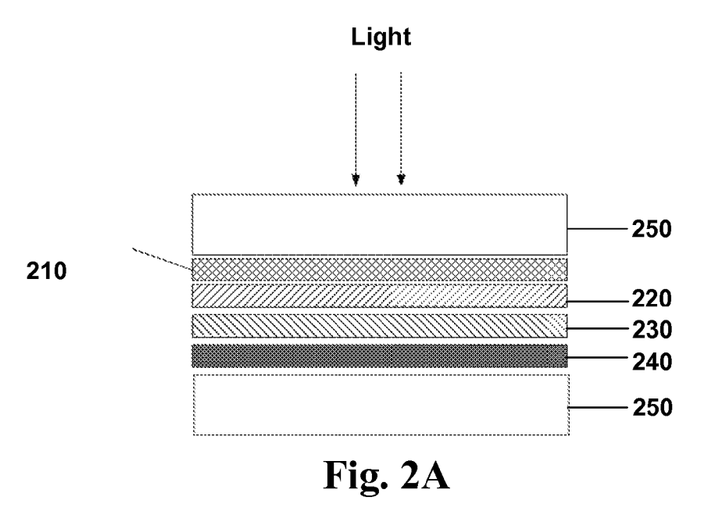
FIG. 2a schematically represents a combination of an upconverting luminescent layer and downconverting quantum dot layers in the light-converting system of the present invention.

In FIG. 2a, a layer of upconverting luminescent material 210 is situated above three layers of three different kinds of downconverting quantum dots 220, 230, 240 to form a sandwich of luminescent material layers. A first downconverting quantum dot layer 220 is composed of a plurality of first quantum dot nanoparticles. A second downconverting quantum dot layer 230 is composed of a plurality of second quantum dot nanoparticles. A third downconverting quantum dot layer 240 is composed of a plurality of third quantum dot nanoparticles. Different types of quantum dot nanoparticles can be distinguished by a difference in materials, a difference in particle size or a difference in size distribution. In other words, it is possible that three different layers of quantum dot nanoparticles are made of the same material but have different particle sizes or size distributions. For example, the first downconverting quantum dot layer may be composed of CdSe quantum dot nanoparticles of 5.0 nm in diameter to emit radiation having a center wavelength of about 625 nm while the second downconverting quantum dot layer is composed of CdSe quantum dot nanoparticles of 2.2 nm in diameter to emit radiation having a center wavelength of about 500 nm.

Figure 2B:
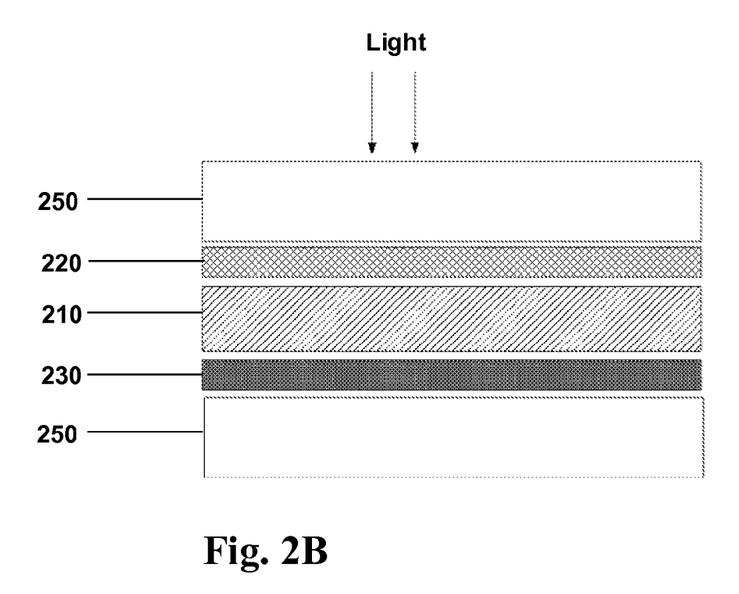
FIG. 2b schematically represents a combination of an upconverting luminescent layer being sandwiched between two downconverting quantum dot layers.

In FIG. 2b, the upconverting luminescent layer 210 is sandwiched between a first downconverting quantum dot layer 220 and a second downconverting quantum dot layer 230. The use of different combinations and sequences of downconverting quantum dot layers and upconverting layer(s) result in different conversion profiles. The upconverting and downconverting luminescent layers are further covered by a glassy layer 250, which can be substituted by polymeric materials or any transparent materials, on top and bottom of the sandwich, to protect the upconverting and downconverting layers.

Microscopically, each quantum dot nanoparticle optionally includes a core and a cap. The core is mainly made of semiconductor selected from IIA-VIA, IIIA-VA, IVA-IVA and IVA-VIA semiconductor. The size of the core ranges from about 1 nm to 50 nm, preferably about 1 nm to 25 nm, more preferably about 1 nm to 10 nm, and most preferably about 1 nm to 5 nm. The size of the cap ranges from about 0.1 nm to 10 nm, more preferably about 0.1 nm to 5 nm, and most preferably about 0.1 nm to 2 nm. The cap passivates the core by providing a wide band gap. The material of the cap is also different from that of the core in order to form a potential barrier around the core. For example, the cap may be made of CdS while the core may be made of CdSe.

Upconverting luminescent materials are typically selected from metal oxides doped with ions of lanthanides such as $Er^{3+}$, $Tm^{3+}$ and $Yb^{3+}$. However, other materials such as transition metal compounds, e.g. $Yb^{3+}$ doped with $CsMnCl_3$ may also be used. The upconverting luminescent material can be in nanoparticle form or in bulk form. As compared to the bulk form, the nanoparticulate upconverting luminescent material has lower light scattering and higher luminescent efficiency.

Figure 3:
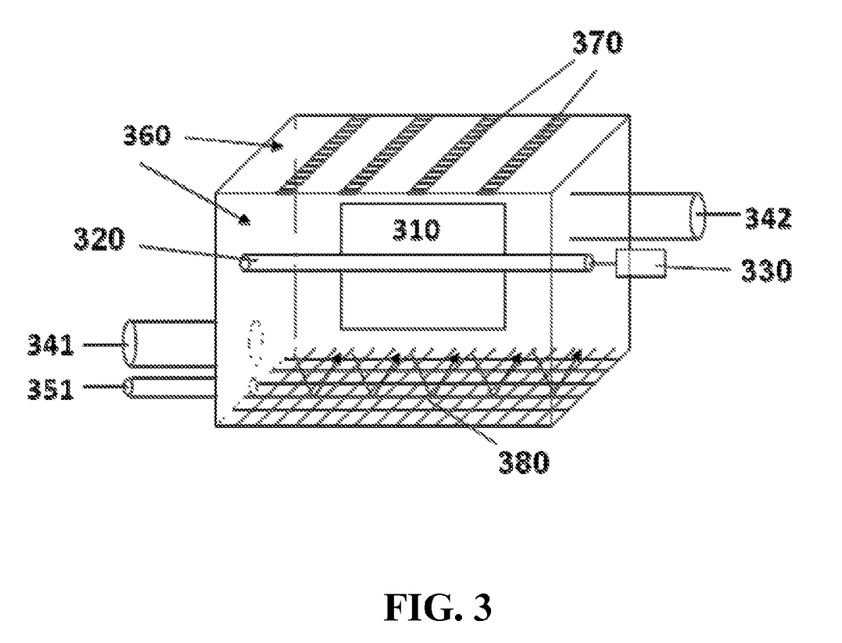
FIG. 3 schematically represents a three-dimensional view of a wastewater algal purification system.

FIG. 3 is a three-dimensional diagram of a wastewater algal purification system including a wastewater container, in which the top wall and/or the sidewalls 360 include the light-converting device of the present invention. The wastewater algal purification system also includes at least one sun tracker incorporating a plurality of screens 310 which are ingrown with algal layer(s) and/or colonies on the surface thereof. The screens 310 are capable of rotating and/or tilting to turn the surface with the algal layer(s)/colonies to a position substantially perpendicular to the path of the light source. The larger the surface area of the screen that is perpendicular to the light path, the more the algae on that surface can be exposed to the maximum light intensity. This idea is similar to the situation where the sunlight reaches the maximum light intensity when the sun is an overhead sun. The screens 310 may be re-usable, with algae being harvested periodically from the screens or, alternatively, they may be made from a biodegradable material and periodically removed from the system to be replaced with new biodegradable screens. The latter application is particularly suitable for applications in which the harvested algae is to be used as fertilizer or for applications in which the algae is contaminated with toxic materials from wastewater and will therefore be disposed of in an alternative manner depending upon the toxic material.

In order to determine the position of the sun, a solar position sensor 330 is also incorporated with the wastewater algal purification system; the position sensor is positioned outside the wastewater algal purification system. The solar position sensor 330 has different sensing modes. One mode is to sense the altitude angle of the sun, ("elevation angle"), which is the angular height of the sun in the sky measured from the horizon. The altitude angle is 0° at sunrise and is 90° when the sun is directly overhead (e.g. at the equator on the spring and fall equinoxes). The altitude angle varies throughout the day. It also depends on the latitude of a particular location and the day of the year. Therefore, the solar position sensor 330 also senses the latitudinal offset of the sun. The maximum altitude angle at solar noon (a) is a function of latitude and the declination angle (S).

For locations in the Northern Hemisphere:

$$\alpha = 90 - \phi + \delta$$

For those in the Southern Hemisphere:

$$\alpha = 90 + \phi - \delta$$

where: $\phi$ is the latitude of the location of interest

In the above formula for the Northern Hemisphere, $\phi$ is positive for Northern Hemisphere locations and negative for the Southern Hemisphere. In the above formula for the Southern Hemisphere, $\phi$ is positive for Southern Hemisphere locations and negative for Northern Hemisphere locations.

The declination angle $\delta$ is measured between the equator and a line drawn from the centre of the Earth to the centre of the sun. It varies seasonally due to the tilt of the Earth on its axis of rotation and the rotation of the Earth around the sun. The Earth is normally tilted by 23.45° and the declination angle varies plus or minus this amount. The declination angle is equal to 0° at the spring and fall equinoxes (i.e. around March 22 and September 22 respectively in each year). The declination angle reaches a maximum of 23.45° on the summer solstice in the northern hemisphere (approximately June 22) and a minimum of −23.45° on the winter solstice in the northern hemisphere (approximately. December 22).

The declination angle can be calculated by the following formula:

$$\delta = 23.45° \sin\left[\frac{360}{365}(d-81)\right]$$

where d is the day of the year with Jan 1 as d=1.

In addition, the solar position sensor 330 can also detect the change in the azimuth angle. The azimuth angle is the compass direction from which the sunlight is coming. At solar noon, the sun is always directly south in the northern hemisphere and directly north in the southern hemisphere. The azimuth angle varies throughout the day. At the equinoxes, the sun rises directly east and sets directly west regardless of the latitude, thus making the azimuth angles 90° at sunrise and 270° at sunset. However, the azimuth angle varies with the latitude and time of year. The azimuth can be calculated from the following formula:

$$\text{Azimuth} = \cos^{-1}\left[\frac{\sin\delta\cos\phi - \cos\delta\sin\phi\cos(HRA)}{\cos\alpha}\right]$$

The sensing mechanism of the solar position sensor 330 is not limited to the above examples and any suitable formula or programs can be applied to the sensor for the purpose of sensing the position of the sun.

In terms of the control mechanism of the sun tracker, an electro-optical unit can be used to actively drive the central axis 320 and the screens 310 in response to the sensed signal from the solar position sensor 330. This active control mechanism can also measure the difference in light intensity between different screens 310 in order to adjust the best tilting angle thereof. Besides the electro-optical unit, a microprocessor can be used solely or in combination with the electro-optical unit. The microprocessor can predict the sun movement of the day based on the calculation of the past data without sensing the sun position of that day in order to control the movement of the screens 310. Such a microprocessor can also rely on a timing mechanism to control the movement of the screens 310. Power supplied to these units and the sun tracker can be generated from photovoltaic cells which are optionally incorporated with the wastewater algal purification system or from external photovoltaic cells or from other power-generating devices including end-products of harvested algae, for example, biogas (methane) from algae which can provide electricity. In a further embodiment, the sun tracker of the present invention is also capable of nocturnal repositioning by a controller according to the sunset position of the preceding day.

In the absence of an electro-optical or electronic unit, the sun tracker can alternatively be driven by a passive control mechanism. Such a passive mechanism mainly relies on solar energy to drive the screens 310 towards the direction of sunlight with maximum light intensity. For example, a series of canisters (not shown in the figure) containing a low boiling point compressed gas fluid (e.g. hydraulic fluid/oil or compressed carbon dioxide) can be installed along the screen 310 to respond to heat generated by solar energy. Once the compressed gas fluid is heated to its boiling point, the gas pressure increases to push the liquid from one end to another end of the canister and, consequently screen 310. The flow of liquid can drive the screen to tilt towards the direction which has maximum solar energy, i.e. maximum light intensity.

In addition to the light-converting device and the sun tracker, the bottom inner surface of the wastewater purification system can also be provided with a light-reflecting layer 380 to reflect any excess penetrated light back to the interior of the system. Furthermore, if natural light is not available, or is not sufficient, or an increase in light intensity is required, a series of artificial lights 370 may optionally be installed at the top layer of the system for substitution or supplementation of the natural light.

A fluid inlet 341 is positioned at a relatively lower level on one sidewall of the system for receiving untreated or semi-treated fluid from the settling pond or from another wastewater algal purification system while a fluid outlet 342 is positioned at relatively higher level on the opposite sidewall to which the inlet 341 is positioned for transporting the fluid treated by the photosynthetic organism on the screens 310 to another facility or to another wastewater algal purification system. A gas inlet 351 is also included to supply the waste gas such as carbon dioxide from any carbon dioxide emission source such as power plants or factories or ambient carbon dioxide to the wastewater algal purification system. The photosynthetic organisms to be grown on the screens 310, can be selected from any species of algae. Preferably, the photosynthetic organism is a species of microalgae. Optionally, a mixture of macroalgae and microalgae can be used for the photosynthetic organism. The particular photosynthetic organism may be selected from cyanobacteria (Cyanophyceae), green algae (Chlorophyceae), diatoms (Bacillariophyceae), yellow-green algae (Xanthophyceae), golden algae (Chrysophyceae), red algae (Rhodophyceae), brown algae (Phaeophyceae), dinoflagellates (Dinophyceae) or 'pico-plankton' (Prasinophyceae and Eustigmatophyceae) or any other photosynthetic material which can be grown in the environment of present invention and may be used for creating fuel or food or a combination of both. Optionally, the photosynthetic organism to be grown on the screens 310 is co-cultured with one or more symbiotic organisms preferably microalga growth-promoting bacteria, for example, *Azospirillum brasilense* strain Cd.

Figure 4:
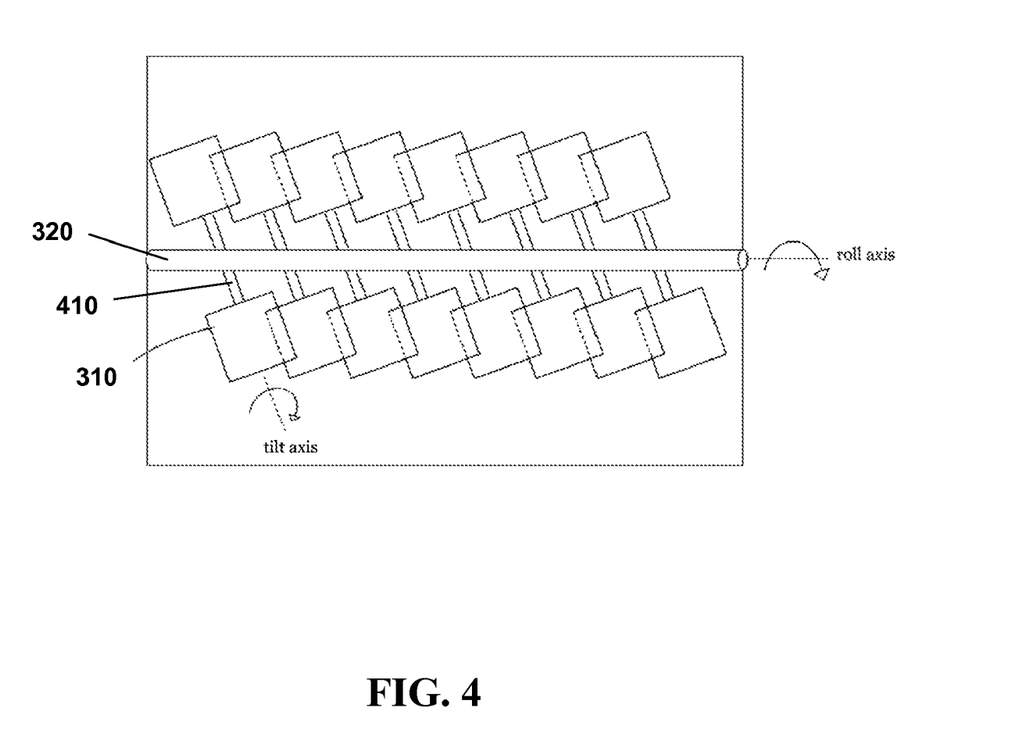
FIG. 4 schematically represents a transverse view of an example of a series of algae screens incorporating into sun tracker.
Figure 5:
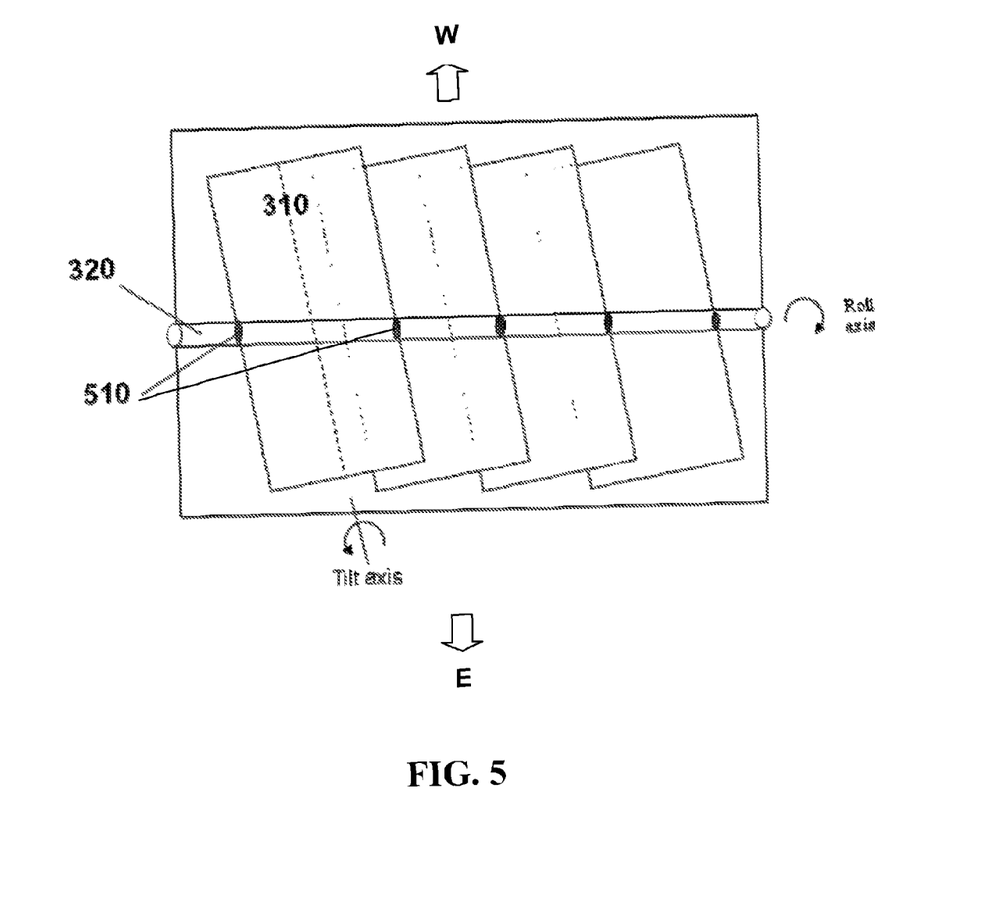
FIG. 5 schematically represents a transverse view of another example of a sun tracker incorporating a plurality of algae screens.
Figure 6:
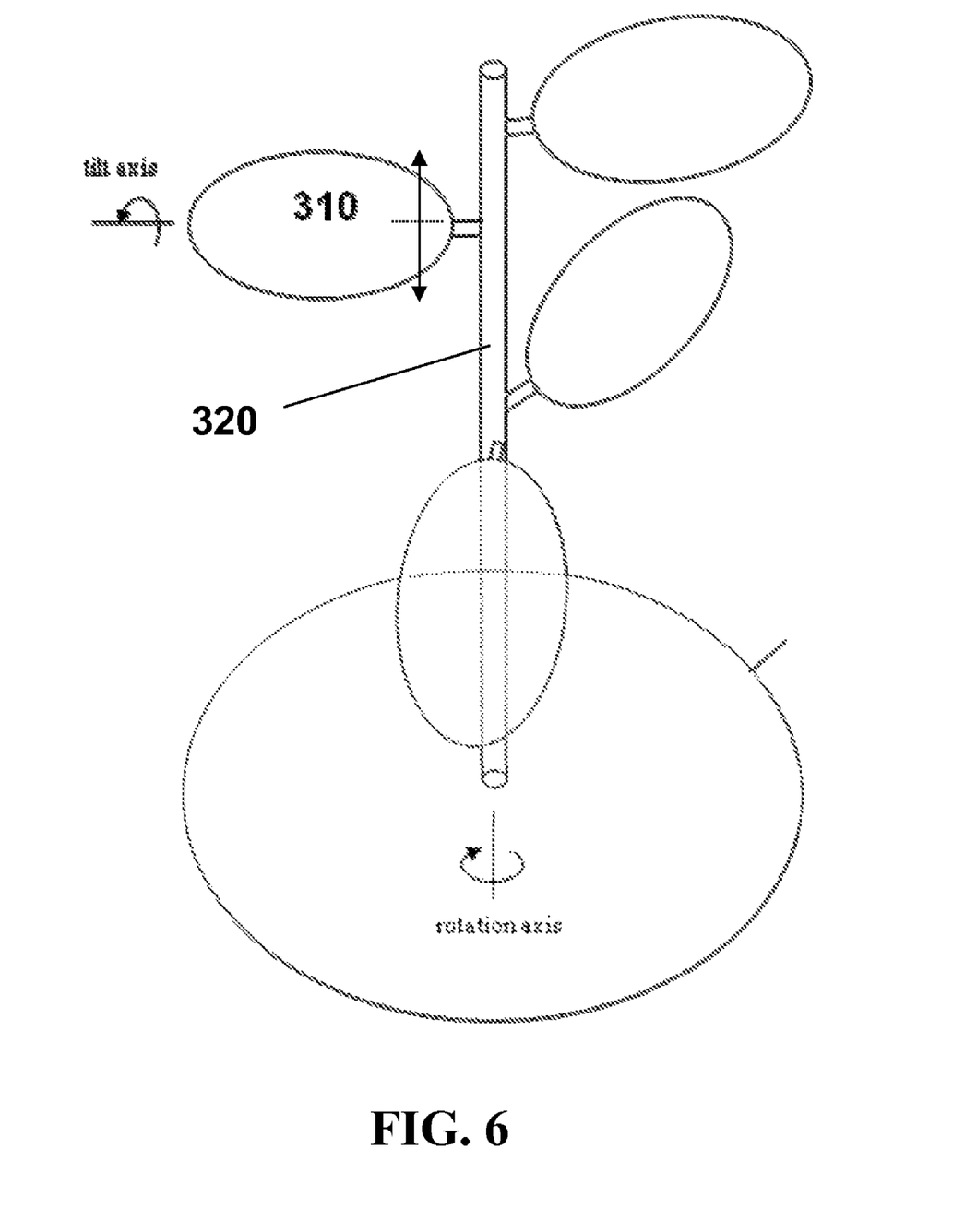
FIG. 6 schematically represents a 3-dimensional view of a circular sun tracker incorporating a plurality of algae screens.

FIGS. 4-6 illustrate different designs of the sun tracker incorporating algae screens. Basically, the sun tracker includes a central axis 320 and a plurality of screens 310. The central axis 320 rotates along the roll axis while the plurality of screens 310 connected to the central axis 320 rotate in the same direction as the central axis 320. The movement of the screens 310 can be driven by the active control mechanism of the present invention in response to the sensed signal from the solar position sensor (not shown in the figures) or in response to the signal from the microprocessor. The rotation and tilting of the screens 310 can also be driven by the passive control mechanism. The axial movement of the screens 310 can be selected from one axis, two axes, or three axes. The shape of the screens 310 can be selected from rectangular, circular, polygonal, and/or irregular shapes.

In an alternative embodiment of the present invention, the settling pond 110 forms a wastewater container which includes the algal purification system. In this embodiment, screen systems 310 are placed directly within settling pond 110 for growth of algae and removal of impurities from wastewater in the settling pond. To enhance photosynthesis, a flexible or rigid cover including one or more light converting material(s) in one or more layer(s), as described above with respect to FIG. 2, is placed over at least a portion of the settling pond (e.g., the portion of the settling pond that includes algae-growth screens 310). A substantially transparent and weather-resistant polymer such as vinyl can be used as the light converting cover for flexible cover materials while glass or polymers such as polycarbonate can form the rigid cover material. Optionally, the sun tracking techniques described with respect to FIGS. 3-7 are used to position the screens within the settling pond. Alternatively, for large area settling ponds, the screens have a relatively fixed position, with the widest portion of the screen positioned substantially parallel to the surface of the settling pond. When the settling pond 110 includes an algal purification system, further algal purification systems positioned downstream of the settling pond are optional, depending on the level of contaminants in the wastewater of the settling pond.

FIG. 4 is an example of a sun tracker driven by an active control mechanism. An electro-optical control unit operating in a closed loop tracking strategy, is used to measure the difference in light intensity between different screens 310 in order to determine an optimal tilting angle to receive maximum light intensity. The electro-optical control unit includes a series of light intensity detectors which are positioned on various parts of the sun tracker or, alternatively, in a separate holder (not shown in the figure). The optical control unit compares the light intensity detected from each light intensity detector and uses the instantaneous measured maximum light intensity as a reference. Using the position of the maximum measured light intensity, the control unit will determine the direction and tilting angle for each screen in order for such screen to be able to receive the maximum light intensity. The data obtained from the light intensity detectors will also be stored in the memory of the control unit for future reference and calculation. The detectors are selected from, but not limited to, photoresistors, photo-diodes, sun photometers, charge-coupled devices, complementary metal-oxide-semiconductor image sensors, or any combinations thereof. In this example, the screens 310 are in paddle-like configuration with extensions 410 connecting each screen 310 to the central axis 320. Due to this design, each screen 310 is capable of tilting independently from another according to light intensity requirements. If necessary, other active control mechanisms and/or the passive control mechanisms of the present invention can also be applied to this example.

FIG. 5 illustrates another example of a sun tracker which incorporates both active and passive control mechanisms. The central axis 320 in this example is driven by the fluid flow in a series of canisters positioned along the screen 310. The screen 310 begins the day facing west. As the sun rises in the east, it heats the low boiling point compressed gas liquid in the non-shaded west-facing canister to force the liquid into the shaded east-side canister. As liquid moves through a connecting tube to the east-facing canister, the screen 310 rotates so that it faces east. When one canister is exposed to the sun more than the other, its vapor pressure increases and then forces the liquid to the cooler, shaded side. The shifting weight of the liquid causes the screen 310 to rotate until the canisters are equally shaded. The screen 310 follows the altitudinal movement of the sun by continually seeking equilibrium as liquid moves from one side of the screen 310 to the other. The screen 310 completes its daily cycle facing west after sunset. It remains in this position overnight until the non-shaded west-side canister is heated again by the rising sun in the following morning. At the same time, the direction and degrees of tilting angle of the screens 310 can be controlled by the same mechanism or by the electro-optical unit as described in the above example in FIG. 4. Due to the Presence of a pair of rotational wheels 510 for each screen 310 along the central axis 320, each screen 310 can rotate along the axis independently from the other.

FIG. 6 illustrates an example of a sun tracker which enables three-axis (x-, y- and z-axis) movement of the screen 310. In this example, the screens 310 rotate along the central axis 320 while each screen 310 tilts along its own tilt axis. In addition, each screen can move in an upward/downward direction (represented by two-ended arrow). The upward/downward directional mechanism can be selected from any suitable joint (not shown in the figure) between the extension from the screen and the central axis 320 such as a ball-and-socket joint. The movement of the screen can be controlled by a microprocessor or any other suitable active controller.

Figure 7:
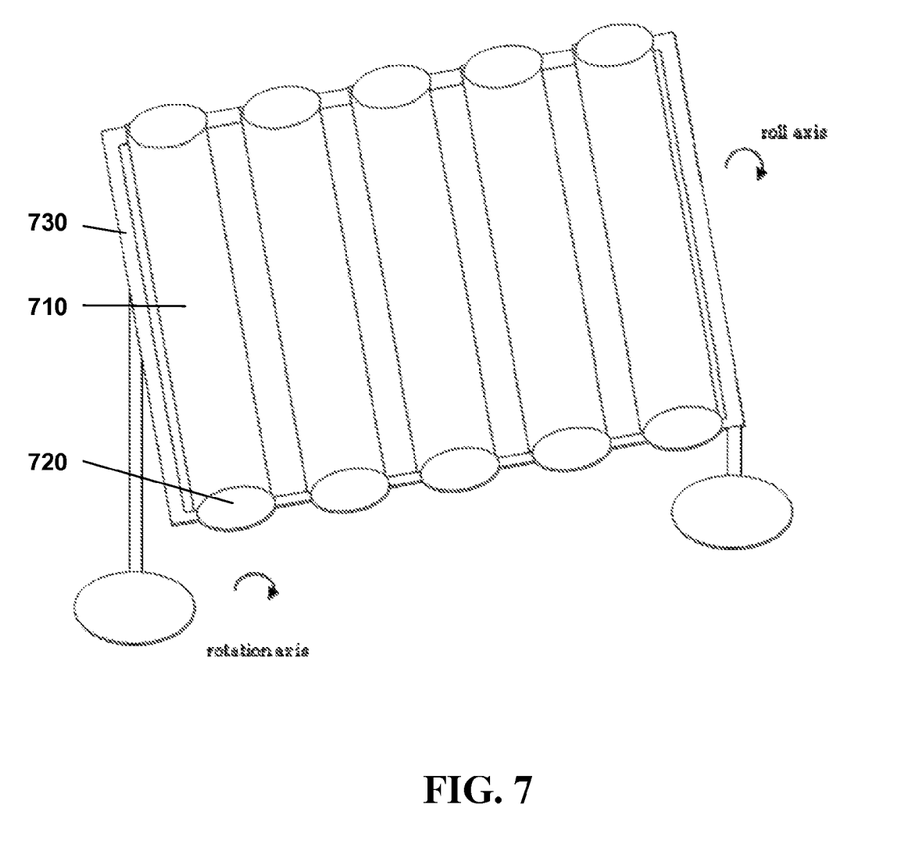
FIG. 7 schematically represents a 3-dimensional view of a cylindrical sun tracker incorporating a plurality of algae screens.

FIG. 7 illustrates an alternative example of a sun tracker. The screen 710 is in a form of a sheet of material surrounding a cylindrical-shape supporter 720. Each supporter 720 has a central axis along the core of its cylindrical body which allows it to rotate along the axis. This design allows a larger surface area of the screen 710 ingrown with algal layer(s) to be constantly exposed to the received light while the supporter 720 is rotating. In addition, a series of cylindrical sun trackers are aligned together in a frame 730 which is rotatable along its own axis (not visible in the figure). The rotation of the frame 730 allows the constantly rotating cylindrical screens to follow the altitudinal path of the sun in order to receive the maximum light intensity during the daytime. The cylindrical sun tracker itself can also be rotated according to the schedule and needs. The movement of the cylindrical sun tracker and the frame 730 can be controlled by an active or passive control mechanism such as by using microprocessor or a series of canisters containing low boiling point compressed gas liquid.

Figure 8:
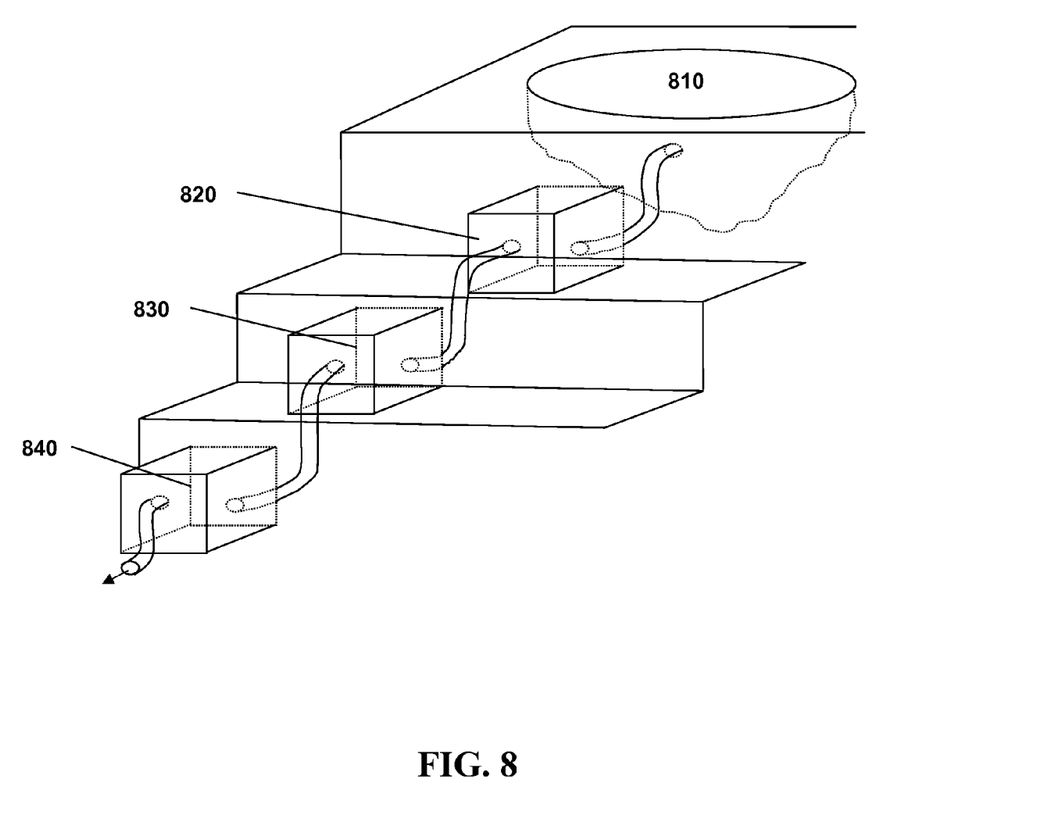
FIG. 8 schematically represents an embodiment of the wastewater algal purification system on a terrace landscape.

FIG. 8 is an example of a series of wastewater algal purification systems connected on a terrace platform. The settling pond 810 is usually situated at a higher level where a conduit connects the fluid outlet of the settling pond 810 and the fluid inlet of the first wastewater algal purification system 820. The first wastewater algal purification system 820 is situated at a lower level than the settling pond 810 following the natural landscape of the terrace. The fluid outlet of the first wastewater algal purification system 820 is also connected to the fluid inlet of the second wastewater algal purification system 830 via another conduit. Similarly, the second wastewater algal purification system 830 is situated at lower level than the first 820 following the terrace landscape. The connection between the second 820 and third wastewater algal purification systems 830 is similar to the above. The fluid flow from the settling pond 810 to the first algal purification system 820 and from each algal purification system to another at a lower level relies on gravitational potential energy without a need for power to pump the fluid. The design of the fluid inlet and outlet pair of each algal purification system, where the inlet is positioned at lower level than the outlet, is to allow sufficient incubation time of the wastewater with the photosynthetic organism in the system. This schematic diagram is for illustrative purpose only; the terrace system of FIG. 8 can be combined with any of the wastewater algal purification systems shown above.

Optionally, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes exemplary embodiments of the invention, these descriptions should not be viewed in a limiting sense. Rather, there are several variations and modifications which may be made without departing from the scope of the present invention as defined in the appended claims.

What is claimed is:

1. A wastewater purification system comprising:
   at least one wastewater container incorporating a light-converting material including one or more layers of upconverting luminescent materials and/or one or more layers of downconverting luminescent materials;
   one or more active and/or passive sun trackers incorporating a plurality of rotatable and/or tilting screens positioned in the wastewater container and configured to serve as substrates for ingrowth of microorganisms and a rolling axis connected to said screens so that said screens rotate with said rolling axis;
   at least a fluid inlet and outlet pair in which said fluid outlet is positioned at relatively higher level than said fluid inlet; and
   a gas inlet.

2. The wastewater purification system of claim 1 further comprising an inner light-reflecting surface at the bottom of the container and a series of artificial light sources positioned opposite to the light-reflecting surface.

3. The wastewater purification system of claim 1 wherein said screens are covered with at least one layer of algae wherein the algae is microalgae or a mixture of macroalgae and microalgae.

4. The wastewater purification system of claim 3 wherein a processing unit is connected to said system to collect and process algae from said screens.

5. The wastewater purification system of claim 1 further comprising a solar position sensor positioned outside the container and connected to said rolling axis in order to sense the position of the sun such that said rolling axis is moved in accordance with the movement of the sun detected by said solar position sensor.

6. The wastewater purification system of claim 5 wherein the movement in accordance with the movement of the sun detected by said solar position sensor during daytime is according to the altitudinal angle of the sun, latitudinal offset of the sun and/or changes in azimuth angle.

7. The wastewater purification system of claim 5 further comprising a controller that repositions the axis during the night in a position opposite to the direction of the sunset of the preceding day as measured by the solar position sensor.

8. The wastewater purification system of claim 1 wherein a settling pond is connected to said system for separating a fluid phase from a solid and/or sludge phase in received wastewater from a wastewater source.

9. The wastewater purification system of claim 1 wherein said downconverting luminescent material of said light-converting device comprises quantum dots and wherein a core of each quantum dot comprises one or more materials selected from IIA-VIA, IIIA-VA, IVA-IVA and IVA-VIA semiconductors in a range of 1 nm to 50 nm.

10. The wastewater purification system of claim 1 wherein said active sun trackers comprise a microprocessor controller and/or an electro-optical controller.

11. The wastewater purification system of claim 1 wherein said passive sun trackers comprise a series of canisters having a low boiling point compressed gas fluid positioned within the canisters.

12. The wastewater purification system of claim 1 wherein the wastewater container is a wastewater settling pond with a cover incorporating said light-converting material including one or more layers of upconverting luminescent materials and/or one or more layers of downconverting luminescent materials.

13. The wastewater purification system of claim 1 wherein the wastewater container is movable.

14. A method of treating wastewater comprising:
   receiving wastewater from a source into a settling pond;
   separating substantially large solid debris and sludge from a fluid phase of the wastewater in said settling pond;
   subjecting the fluid phase of said wastewater in said settling pond to at least one algal purification system having one or more active and/or passive sun trackers incorporating a plurality of rotatable and/or tilting screens ingrown with at least one layer of algae wherein the algae is microalgae or a mixture of microalgae and macroalgae;
   directing sunlight or artificial light to said plurality of screens through one or more layers of upconverting luminescent materials and/or one or more layers of downconverting luminescent materials coated on at least a portion of said algal purification system;
   supplying $CO_2$ from atmosphere or an external source to said algal purification system; and
   collecting and processing said layer of algae from said screens regularly for production of biogas, biofuel or other by-products.

15. A method of treating wastewater according to claim 14 wherein said directing further comprising sensing the instant position of sun by measuring an altitude angle, latitudinal offset or changes in azimuth angle of the sun such that said plurality of screens rotates and/or tilts towards the instant position of the sun.

16. A method of treating wastewater according to claim 14 wherein said directing further comprises controlling said one or more active and/or passive sun trackers by an active control mechanism, passive control mechanism or a combination thereof.

17. A method of treating wastewater according to claim 16 wherein said active control mechanism comprises the prediction of sun position based on past data and/or the determination of the sun position based on the difference in the light intensity instantly received by different part of said algal purification system.

18. A method of treating wastewater according to claim 16 wherein said passive control mechanism comprises converting solar energy into kinetic energy to drive the movement of a liquid from one end to another end in said sun tracker until equilibrium such that said screens faces the direction of the sun.

19. A method of treating wastewater according to claim 14 wherein said collecting and processing the algae comprises scraping, vacuum suction, vibration, centrifugation, flocculation, filtration or ultrasound wave treatment of the algae.

20. A method of treating wastewater according to claim 14 wherein the algal purification system is positioned within the settling pond or downstream of the settling pond.

* * * * *